(12) United States Patent
Kohut et al.

(10) Patent No.: US 6,912,540 B2
(45) Date of Patent: Jun. 28, 2005

(54) CHAINING DATABASE RECORDS THAT REPRESENT A SINGLE CUSTOMER OR MULTIPLE CUSTOMERS LIVING IN A HOUSEHOLD

(75) Inventors: Eric J. Kohut, Chicago, IL (US); James E. Pricer, New York, NY (US)

(73) Assignee: NCR Corporation, Dayton, OH (US)

( * ) Notice: Subject to any disclaimer, the term of this patent is extended or adjusted under 35 U.S.C. 154(b) by 385 days.

(21) Appl. No.: 10/138,665

(22) Filed: May 3, 2002

(65) Prior Publication Data

US 2002/0184222 A1 Dec. 5, 2002

Related U.S. Application Data

(60) Provisional application No. 60/288,723, filed on May 4, 2001.

(51) Int. Cl.[7] .................................................. G06F 7/00
(52) U.S. Cl. ..................... 707/101; 707/100; 707/104.1
(58) Field of Search .................... 707/1–10, 100–104.1, 707/200–205; 705/7–8, 10, 14, 35–53, 57, 80, 26; 379/211.01, 111, 112, 114.01, 188–189, 67.1; 709/217–218, 238, 200, 230

(56) References Cited

U.S. PATENT DOCUMENTS 5,774,887 A * 6/1998 Wolff et al. .................... 707/1

6,085,238 A * 7/2000 Yuasa et al. ................. 709/223
6,470,379 B1 * 10/2002 Mori ........................... 709/206

OTHER PUBLICATIONS

Eric J. Kohut, James E. Pricer, "Chaining database records that represent a single customer or multiple customers living in a household", US Provisional Application 60/288,723.*

* cited by examiner

*Primary Examiner*—Greta Robinson
*Assistant Examiner*—Linh Black
(74) *Attorney, Agent, or Firm*—John D. Cowart

(57) ABSTRACT

A data-processing technique improves the process of "householding" customer data in a company's relational database system. The process involves combining data from two or more attribute columns in one or more relational tables to form a single column of concatenated data. The concatenated data is used in identifying two or more records that share a common value, which indicates that the records all represent a particular customer. A unique identification value is assigned to this customer and is stored with each of the identified records. In some embodiments, the process is used in identifying records that represent multiple customers living together in a single household.

8 Claims, 14 Drawing Sheets

| acct_nbr | phone_nbr | soc_sec_nbr | license_nbr | name_addrss | cust_id | row_nbr |
|---|---|---|---|---|---|---|
| 11111 | | 111223333 | 12345 | | 98765 | 1 |
| | | 222334444 | | efgh | 87654 | 2 |
| 33333 | 2125551213 | 111223333 | 34567 | ijklm | 76543 | 3 |
| 44444 | 2125551214 | 333445555 | | nopq | 54321 | 4 |
| 55555 | 2125551215 | 444556666 | 45678 | | | 5 |
| 66666 | 2125551216 | 555667777 | 90123 | rstu | | 6 |
| | 2125551217 | 666778888 | 44556 | vwxy | 12131 | 7 |
| 88888 | | 81056690 | 56690 | zaqpr | 81056 | 8 |
| 77777 | | 81056690 | 90566 | lkseb | 37473 | 9 |
| 10101 | 8104121564 | 941426079 | 98765 | kjand | 56789 | 10 |
| 11101 | 8102477543 | 941426097 | 90965 | bvcnd | 56909 | 11 |

*FIG. 3*

| key_cd | key_desc | max_hh_nbr |
|---|---|---|
| 1 | ACCT_NBR | 0 |
| 2 | PHONE_NBR | 0 |
| 3 | SOC_SEC_NBR | 0 |
| 4 | LICENSE_NBR | 0 |
| 5 | NAME_ADDRSS | 0 |
| 6 | CUST_ID | 0 |

*FIG. 5*

|     | 620 | 630 | 610 | 640 |
|---|---|---|---|---|
| | row_nbr | key_cd | key_value | new_hh_nbr |
| | 1 | 1 | 11111 | 1 |
| | 2 | 1 | 22222 | 2 |
| | 3 | 1 | 33333 | 3 |
| | 4 | 1 | 44444 | 4 |
| | 5 | 1 | 55555 | 5 |
| | 6 | 1 | 66666 | 6 |
| | 7 | 1 | 22222 | 7 |
| | 8 | 1 | 88888 | 8 |
| | 9 | 1 | 77777 | 9 |
| | 10 | 1 | 10101 | 10 |
| | 11 | 1 | 11101 | 11 |
| | 1 | 2 | 2125551212 | 12 |
| | 2 | 2 | 2125551212 | 13 |
| | 3 | 2 | 2125551213 | 14 |
| | 4 | 2 | 2125551214 | 15 |
| | 5 | 2 | 2125551215 | 16 |
| | 6 | 2 | 2125551216 | 17 |
| | 7 | 2 | 2125551217 | 18 |
| | 8 | 2 | 8103509088 | 19 |
| | 9 | 2 | 8103509088 | 20 |
| | 10 | 2 | 8104121564 | 21 |
| | 11 | 2 | 8102477543 | 22 |
| | 1 | 3 | 111223333 | 23 |
| | 2 | 3 | 222334444 | 24 |
| | 3 | 3 | 111223333 | 25 |
| | 4 | 3 | 333445555 | 26 |
| | 5 | 3 | 444556666 | 27 |
| | 6 | 3 | 555667777 | 28 |
| | 7 | 3 | 666778888 | 29 |
| | 8 | 3 | 81056690 | 30 |
| | 9 | 3 | 81056690 | 31 |
| | 10 | 3 | 941426079 | 32 |
| | 11 | 3 | 941426097 | 33 |
| | 1 | 4 | 12345 | 34 |
| | 2 | 4 | 23456 | 35 |
| | 3 | 4 | 34567 | 36 |
| | 4 | 4 | 23456 | 37 |
| | 5 | 4 | 45678 | 38 |
| | 6 | 4 | 90123 | 39 |
| | 7 | 4 | 44556 | 40 |
| | 8 | 4 | 56690 | 41 |
| | 9 | 4 | 90566 | 42 |
| | 10 | 4 | 98765 | 43 |
| | 11 | 4 | 90965 | 44 |
| | 1 | 5 | abcd | 45 |
| | 2 | 5 | efgh | 46 |
| | 3 | 5 | ijklm | 47 |
| | 4 | 5 | nopq | 48 |
| | 5 | 5 | abcd | 49 |
| | 6 | 5 | rstu | 50 |
| | 7 | 5 | vwxy | 51 |
| | 8 | 5 | zaqpr | 52 |
| | 9 | 5 | lkseb | 53 |
| | 10 | 5 | kjand | 54 |
| | 11 | 5 | bvcnd | 55 |
| | 1 | 6 | 98765 | 56 |
| | 2 | 6 | 87654 | 57 |
| | 3 | 6 | 76543 | 58 |
| | 4 | 6 | 54321 | 59 |
| | 5 | 6 | 43210 | 60 |
| | 6 | 6 | 43210 | 61 |
| | 7 | 6 | 12131 | 62 |
| | 8 | 6 | 81056 | 63 |
| | 9 | 6 | 37473 | 64 |
| | 10 | 6 | 56789 | 65 |
| | 11 | 6 | 56909 | 66 |

| row_nbr | new_hh_nbr |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |

| key_cd | key_value | new_hh_nbr |
|---|---|---|
| 1 | 11111 | 1 |
| 1 | 22222 | 2 |
| 1 | 33333 | 3 |
| 1 | 44444 | 4 |
| 1 | 55555 | 5 |
| 1 | 66666 | 6 |
| 1 | 88888 | 8 |
| 1 | 77777 | 9 |
| 1 | 10101 | 10 |
| 1 | 11101 | 11 |
| 2 | 2125551212 | 12 |
| 2 | 2125551213 | 14 |
| 2 | 2125551214 | 15 |
| 2 | 2125551215 | 16 |
| 2 | 2125551216 | 17 |
| 2 | 2125551217 | 18 |
| 2 | 8103509088 | 19 |
| 2 | 8104121564 | 21 |
| 2 | 8102477543 | 22 |
| 3 | 111223333 | 23 |
| 3 | 222334444 | 24 |
| 3 | 333445555 | 26 |
| 3 | 444556666 | 27 |
| 3 | 555667777 | 28 |
| 3 | 666778888 | 29 |
| 3 | 81056690 | 30 |
| 3 | 941426079 | 32 |
| 3 | 941426097 | 33 |
| 4 | 12345 | 34 |
| 4 | 23456 | 35 |
| 4 | 34567 | 36 |
| 4 | 45678 | 38 |
| 4 | 90123 | 39 |
| 4 | 44556 | 40 |
| 4 | 56690 | 41 |
| 4 | 90566 | 42 |
| 4 | 98765 | 43 |
| 4 | 90965 | 44 |
| 5 | abcd | 45 |
| 5 | efgh | 46 |
| 5 | ijklm | 47 |
| 5 | nopq | 48 |
| 5 | rstu | 50 |
| 5 | vwxy | 51 |
| 5 | zaqpr | 52 |
| 5 | lkseb | 53 |
| 5 | kjand | 54 |
| 5 | Bvcnd | 55 |
| 6 | 98765 | 56 |
| 6 | 87654 | 57 |
| 6 | 76543 | 58 |
| 6 | 54321 | 59 |
| 6 | 43210 | 60 |
| 6 | 12131 | 62 |
| 6 | 81056 | 63 |
| 6 | 37473 | 64 |
| 6 | 56789 | 65 |
| 6 | 56909 | 66 |

FIG. 8

| row_nbr | Key_cd | key_value | new_hh_nbr |
|---|---|---|---|
| 1 | 1 | 11111 | 1 |
| 1 | 2 | 2125551212 | 1 |
| 1 | 3 | 111223333 | 1 |
| 1 | 4 | 12345 | 1 |
| 1 | 5 | abcd | 1 |
| 1 | 6 | 98765 | 1 |
| 2 | 1 | 22222 | 2 |
| 2 | 2 | 2125551212 | 2 |
| 2 | 3 | 222334444 | 2 |
| 2 | 4 | 23456 | 2 |
| 2 | 5 | efgh | 2 |
| 2 | 6 | 87654 | 2 |
| 7 | 1 | 22222 | 2 |
| 3 | 1 | 33333 | 3 |
| 3 | 2 | 2125551213 | 3 |
| 3 | 3 | 111223333 | 3 |
| 3 | 4 | 34567 | 3 |
| 3 | 5 | ijklm | 3 |
| 3 | 6 | 76543 | 3 |
| 4 | 1 | 44444 | 4 |
| 4 | 2 | 2125551214 | 4 |
| 4 | 3 | 333445555 | 4 |
| 4 | 4 | 23456 | 4 |
| 4 | 5 | nopq | 4 |
| 4 | 6 | 54321 | 4 |
| 5 | 1 | 55555 | 5 |
| 5 | 2 | 2125551215 | 5 |
| 5 | 3 | 444556666 | 5 |
| 5 | 4 | 45678 | 5 |
| 5 | 5 | abcd | 5 |
| 5 | 6 | 43210 | 5 |
| 6 | 1 | 66666 | 6 |
| 6 | 2 | 2125551216 | 6 |
| 6 | 3 | 555667777 | 6 |
| 6 | 4 | 90123 | 6 |
| 6 | 5 | rstu | 6 |
| 6 | 6 | 43210 | 6 |
| 7 | 2 | 2125551217 | 7 |
| 7 | 3 | 666778888 | 7 |
| 7 | 4 | 44556 | 7 |
| 7 | 5 | vwxy | 7 |
| 7 | 6 | 12131 | 7 |
| 8 | 1 | 88888 | 8 |
| 8 | 2 | 8103509088 | 8 |
| 8 | 3 | 81056690 | 8 |
| 8 | 4 | 56690 | 8 |
| 8 | 5 | zaqpr | 8 |
| 8 | 6 | 81056 | 8 |
| 9 | 1 | 77777 | 9 |
| 9 | 2 | 8103509088 | 9 |
| 9 | 3 | 81056690 | 9 |
| 9 | 4 | 90566 | 9 |
| 9 | 5 | lkseb | 9 |
| 9 | 6 | 37473 | 9 |
| 10 | 1 | 10101 | 10 |
| 10 | 2 | 8104121564 | 10 |
| 10 | 3 | 941426079 | 10 |
| 10 | 4 | 98765 | 10 |
| 10 | 5 | kjand | 10 |
| 10 | 6 | 56789 | 10 |
| 11 | 1 | 11101 | 11 |
| 11 | 2 | 8102477543 | 11 |
| 11 | 3 | 941426097 | 11 |
| 11 | 4 | 90965 | 11 |
| 11 | 5 | bvcnd | 11 |
| 11 | 6 | 56909 | 11 |

*FIG. 10*

| acct_nbr | phone_nbr | soc_sec_nbr | license_nbr | name_addrss | cust_id | row_nbr | hh_nbr |
|---|---|---|---|---|---|---|---|
| 11111 | 2125551212 | 111223333 | 12345 | abcd | 98765 | 1 | 1 |
| 22222 | 2125551212 | 222334444 | 23456 | efgh | 87654 | 2 | 1 |
| 33333 | 2125551213 | 111223333 | 34567 | ijklm | 76543 | 3 | 1 |
| 44444 | 2125551214 | 333445555 | 23456 | nopq | 54321 | 4 | 1 |
| 55555 | 2125551215 | 444556666 | 45678 | abcd | 43210 | 5 | 1 |
| 66666 | 2125551216 | 555667777 | 90123 | rstu | 43210 | 6 | 1 |
| 22222 | 2125551217 | 666778888 | 44556 | vwxy | 12131 | 7 | 1 |
| 88888 | 8103509088 | 81056690 | 56690 | zaqpr | 81056 | 8 | 8 |
| 77777 | 8103509088 | 81056690 | 90566 | lkseb | 37473 | 9 | 8 |
| 10101 | 8104121564 | 941426079 | 98765 | kjand | 56789 | 10 | 10 |
| 11101 | 8102477543 | 941426097 | 90965 | bvcnd | 56909 | 11 | 11 |

FIG. 12

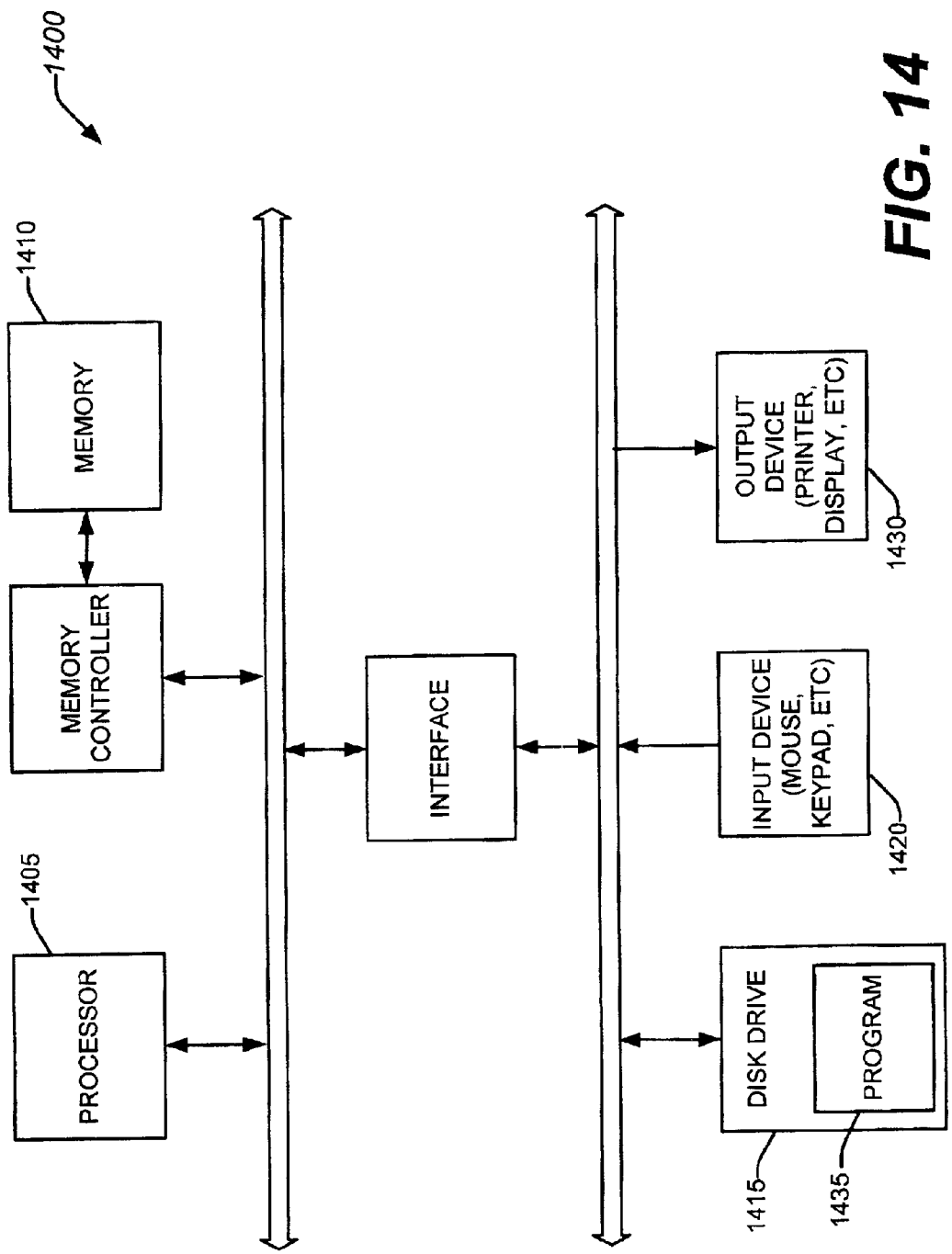

CHAINING DATABASE RECORDS THAT REPRESENT A SINGLE CUSTOMER OR MULTIPLE CUSTOMERS LIVING IN A HOUSEHOLD

RELATED APPLICATIONS

This application claims priority from U.S. provisional application 60/288,723, filed May 4, 2001.

BACKGROUND

Many, if not most, companies today keep very sophisticated databases that act as repositories for vast amounts of information on the interactions between those companies and their customers and households of customers. Many of these companies use this information in devising customer relationship management (CRM) campaigns that target specific types of product or service offers to particular types of customers. Among the most recognizable CRM activities are direct-mail and telemarketing campaigns, both of which involve direct communication between a business and its actual or potential customers.

CRM campaigns typically provide benefits to both the company behind the campaign and the customers targeted by the campaign. A well-targeted campaign delivers product and service offers only to those customers who are likely to show interest in the offers. The customer benefits by learning of interesting products or services that might not otherwise have come to light and by receiving some sort of benefit, often in the form of a price discount or free gift, that the general public does not receive. The company benefits by ensuring that the people most likely to purchase its products or services are aware of those products and services and have incentive to purchase them.

Unfortunately, even the most well planned campaigns are not as efficient as they could or should be. One common type of inefficiency is sending duplicate pieces of mail to a customer or to multiple customers in a single household. The customer usually feels frustration in receiving more pieces of mail than are necessary, and the company suffers unnecessary costs in printing and delivering redundant mail. The source of such inefficiency is usually the company's inability to detect that it has multiple database records for one person or for multiple people living in the same household.

Rudimentary database and CRM tools have been developed to attack this and other types of inefficiency by "chaining" together database records corresponding to a single person or a single household. One such tool, developed by NCR Corporation, identifies database records that share one or more common entries—such as a social security number for a customer identified by two different names in the database, or a home address or telephone number for two separate customers living in a single household—and establishes a link between the records so that the records are collectively treated as a single household. These tools, however, useful as they are, still do not address all of the concerns of companies that rely on large databases for campaigns such as these.

SUMMARY

Described below is a technique for use in improving the process of "householding" customer data in a company's relational database system. The technique allows for the chaining of database records on multiple attributes concurrently to ensure faster, more accurate, and more complete linking of records than previously possible.

The process involves combining data from two or more attribute columns in one or more relational tables to form a single column of concatenated data. The concatenated data is used in identifying two or more records that share a common value, which indicates that the records all represent a particular customer. A unique identification value is assigned to this customer and is stored with each of the identified records. In some embodiments, the process is used in identifying records that represent multiple customers living together in a single household.

Other features and advantages will become apparent from the description and claims that follow.

BRIEF DESCRIPTION OF THE DRAWINGS

FIG. 3 is a view of a database table in which the database records have been prepared for submission to a chaining process.

FIGS. 5, 6, 7, 8, 9, and 10 are result sets derived from database tables generated during intermediate steps of the chaining process.

FIG. 12 is a view of a database table showing the results of the chaining process.

FIG. 14 is a schematic diagram of a computer system suitable for use in executing a computer program that embodies a householding technique.

DETAILED DESCRIPTION

Figure 1:
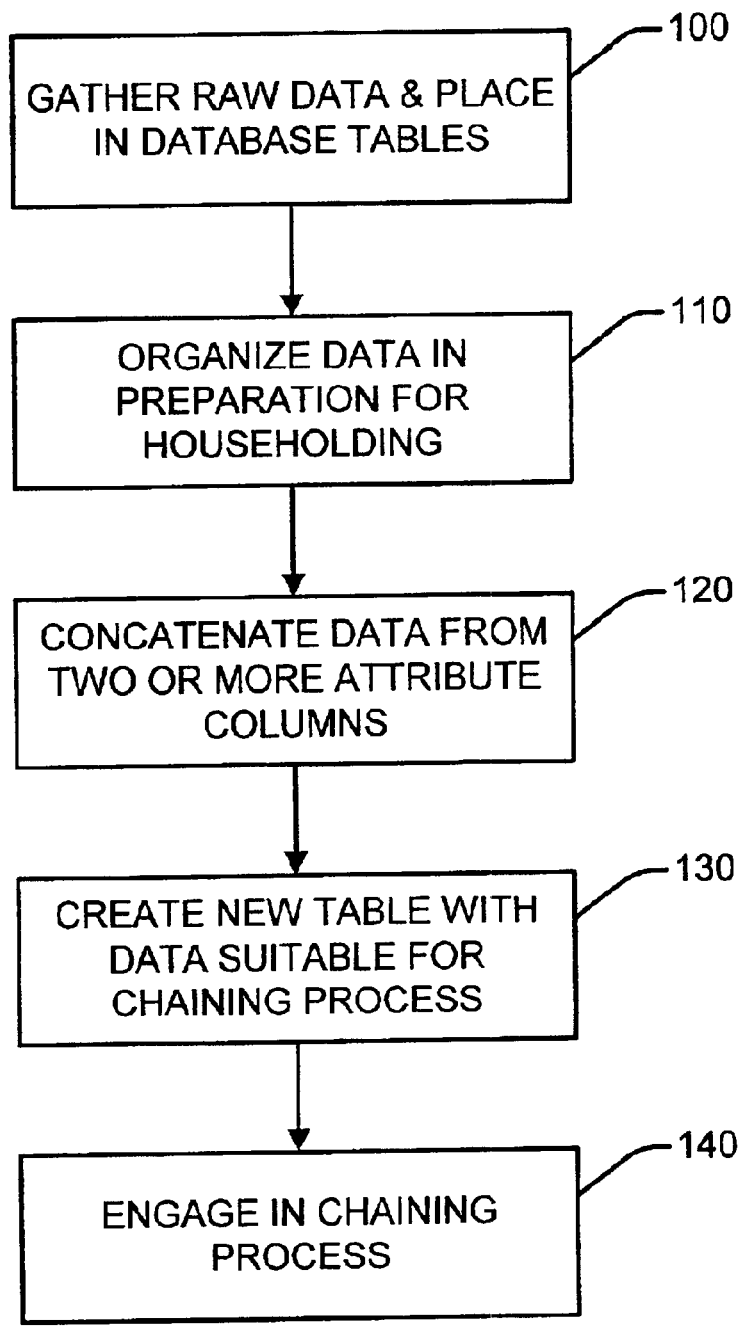
FIG. 1 is flow chart of a process for "householding" records in a database.

FIG. 1 shows a technique for use in chaining together records in a relational database that correspond to a single entity, as defined by some set of business rules. In a customer relationship management (CRM) campaign conducted by a company that sells products or services to consumers, the entity might be a single customer or a group of customers living in a single household who, absent chaining, appear from the database records to be multiple unrelated customers.

Figure 2:
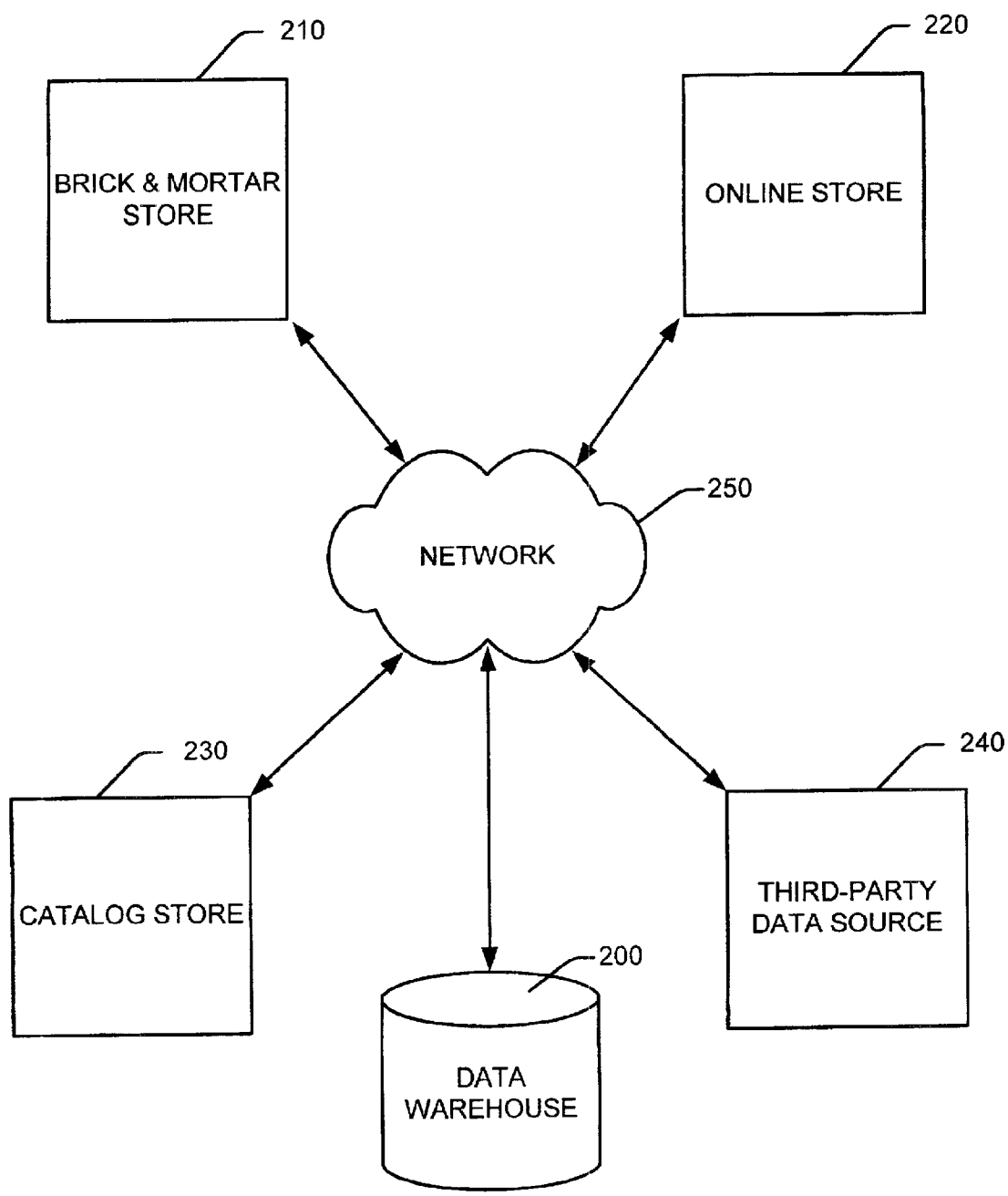
FIG. 2 is schematic diagram of a network through which vast amounts of data are gathered and stored in a large database system, or data warehouse.

The technique applies most often to data containing information about transactions between a business entity and its customers (customer-transaction data). As shown in FIG. 2, this data is typically collected through multiple customer-interface points—such as at a brick-and-mortar retail store 210, by an online retail center 220, through a catalog-order center 230, or from a third-party information clearinghouse 240—and delivered through a network 250 to a data warehousing system 200 maintained by the business (step 100).

Before undergoing the chaining process, the raw data in the database is "preprocessed," or prepared for chaining (step 110). Preprocessing the data allows the chaining process to run much more quickly and with greater accuracy than it would if it were acting on raw data. During preprocessing, data undergoes "cleansing" to ensure, for example, that all data entries in one column of a database table adhere to a standard format. An example of normalizing would be correcting erroneous zip codes using address lines. The data also undergoes reformatting to ensure that the data conforms to certain business rules established for the type of data for which the chaining process is taking place. For example, reformatting the data might involve selecting only that data which is relevant to the campaign at hand and then placing that data into a newly created table.

An important preprocessing step involves "concatenating" the data in two or more attribute columns to form a single column of data (step 120). The purpose of concatenation is two-fold. Combining multiple attributes into a single attribute column protects against chaining two unrelated database records that just happen to share a value in an attribute column. For example, out-of-date or incorrect customer records might show two unrelated customers living at the same address. Combining (or concatenating) the "name" and "address" fields of the customer data records reduces the chance that improper chaining will occur.

Perhaps more importantly, concatenating the data from multiple attribute columns allows chaining on the multiple attributes at once. As described below, the chaining process links data records that share values in certain attribute columns. When operating on concatenated data, the chaining process links records having common data values derived from multiple attribute columns. As a result, the chaining process described here is far more efficient and executes much more quickly than previous techniques.

In some embodiments, the preprocessed data undergoes a data-minimization process, which weeds out data records that are not likely to contribute significantly to the results of the chaining process (step 130). This process often includes grouping data records that have data elements in common and then selecting only those data records that share some minimum number of data elements (e.g., two or more) with other data records. Data records that have only one or no elements in common with other records are not as likely to produce reliable chaining results. The data-minimization process usually leads to the creation of a new table that stores all of the selected database records.

Once the data has been gathered, preprocessed, and minimized, the data enters the chaining process (step 140). This process is described in detail below.

FIG. 3 shows a table 300 of customer data that has been preprocessed in preparation for chaining. This table 300, known as a "base table," includes six attribute columns selected according to the business rules established for the campaign at hand. Five of these columns identify each customer by customer-identification number 320, by license number 330, by Social Security number 340, by phone number 350, and by account number 360, respectively. The sixth attribute column 310 includes data concatenated from two attribute columns ("name" and "address") in the database table from which it is derived. This concatenated data helps eliminate the possibility that data records for two unrelated customers share values that make the two look like one. The table also includes a column 370 that assigns a unique and sequential number to each row in the table.

For purposes of illustration, the data in the base table 300 has been grouped so that all rows that share a common data element follow each other sequentially. For example, rows one and two contain identical values in the "phone_nbr" column 350. Rows one and three have identical values in the "soc_sec_nbr" column 340. Rows two and four share values in the "license_nbr" column 330. Likewise, rows five, six and seven each share a value with one of the preceding rows. Therefore, a quick review of this table reveals that rows one through seven all correspond to a single household.

Rows eight and nine do not share any data values with the first seven rows, but they do share data values with each other in the "phone_nbr" column 350 and thus together define a single household. Rows ten and eleven do not share data values with any of the other rows, and therefore each defines a unique household. This table 300 thus includes eleven rows of data that together define four distinct households.

A company that would rely on this table, without chaining, in launching a CRM campaign would initiate eleven customer contacts when only four contacts would suffice. One household would be contacted at least seven times and might, through irritation, ignore the company's otherwise intriguing business offers.

Figure 4:
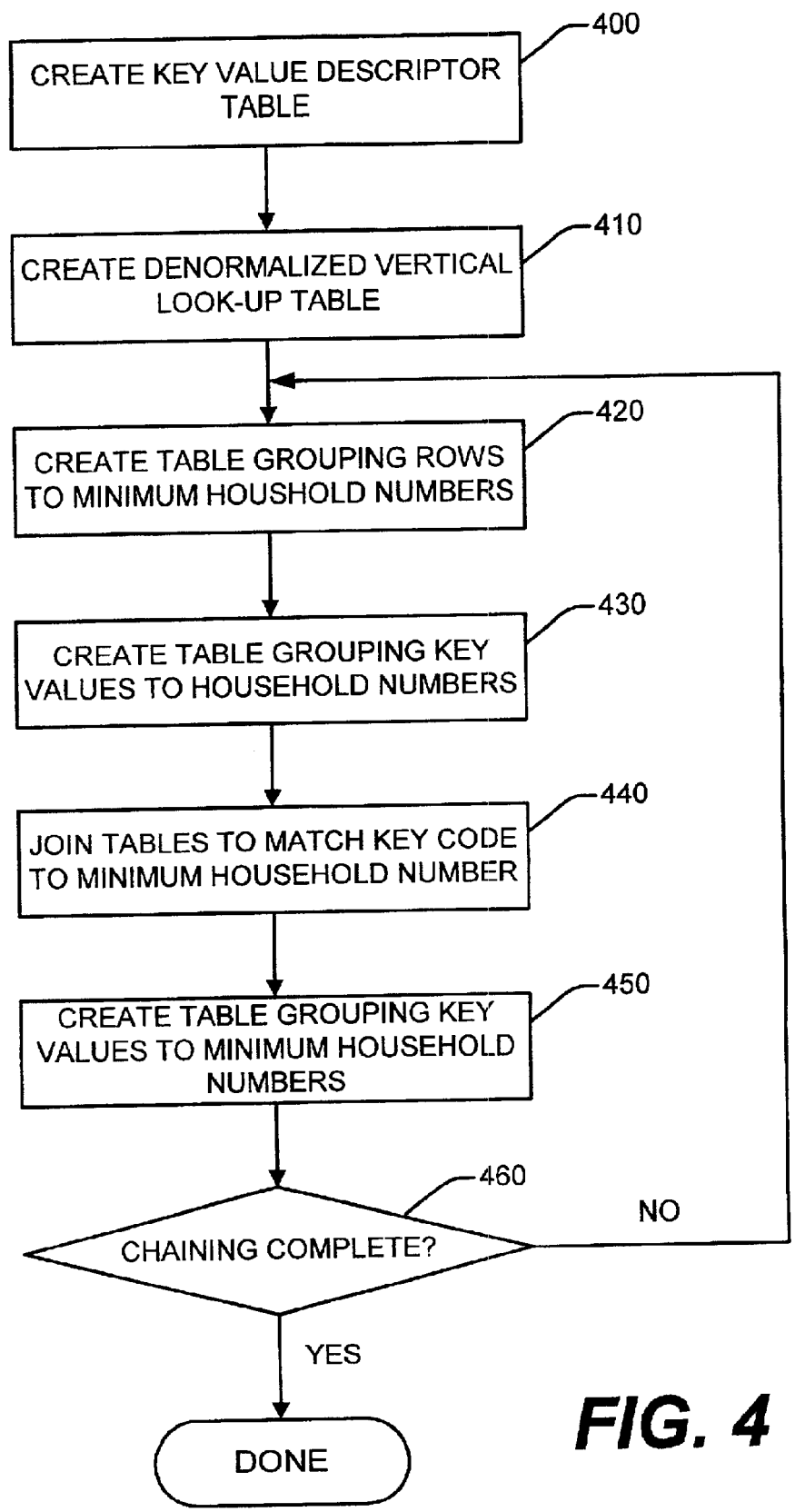
FIG. 4 is a flow chart for a chaining process.

FIG. 4 shows one chaining technique in more detail. The technique is a multi-step, multi-pass process that identifies database records which together define an individual customer or household. The process groups database records that share one or more common values in selected attribute ("key value") columns.

The chaining process typically acts on a table of preprocessed data (or "base table") like that shown in FIG. 3 and described above. The process begins by generating a "key value descriptor table," which contains data like that shown in the result set 500 of FIG. 5 (step 400). The result set 500 derived from the key value descriptor table includes a column 510 that lists the attributes, or key descriptors, that define the columns of the preprocessed data table. In the example here, the key descriptors are "acct_nbr," "phone_nbr," "soc_sec_nbr," license_nbr, "name_address," and "cust_id." The result set also includes a column 520 ("key_cd") that assigns numerical key codes to each of the key descriptors (the numbers one through six in this example). A third column 530 ("max_hh_nbr") identifies the highest household number assigned to each of the key values in the base table. Household numbers are described in more detail below.

In addition to the key value descriptor table, the base table is used to create a denormalized vertical lookup table, which contains data like that shown in the result set 600 of FIG. 6 (step 410). The result set derived from the denormalized vertical lookup table includes a column 610 ("key_value") that contains one entry for every cell in the base table from which it is created. In the example here, the result set 600 includes sixty-six rows, one for each cell in the base table 300 of FIG. 3 (excluding the "row_nbr" column 370, which does not contain any key values).

The result set 600 for the denormalized lookup table also includes a column 620 ("row_nbr") showing which row of the base table the corresponding key value was taken from. Another column 630 ("key_cd") shows the key code associated with the key value appearing in each row to identify the source of the key value. A fourth column 640 ("new_hh_nbr") assigns a sequential and unique household number to each entry in the table.

The household number identifies the household to which each key value has been assigned. At the beginning of the chaining process, each entry in the base table is treated as though it belongs to a distinct household. In this example, the denormalized lookup table initially shows sixty-six households. When the chaining process is complete, the table will list only four household numbers.

Once the denormalized lookup table has been created, the data undergoes five simple processing steps that are repeated as many times as necessary to complete the chaining process. Previous chaining techniques have required far more than five steps, sometimes numbering in the thousands, and thus were much more complex. The use of concatenated data is one reason that five repeated steps are sufficient in this technique.

The columns of the denormalized table are taken from the base data and can be used either as simple column attributes or as complex combinations of columns to implement business rules. An example of a moderately complex column is the concatenation of a customer's name and address into a single column of data. A business rule such as this helps, for example, to identify different people living at the same address over time as separate "households."

Figure 7:
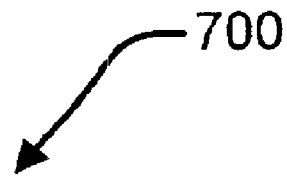

The first step in the chaining process involves forming a table that groups the row numbers from the base table with several "minimum" household numbers (step 420). FIG. 7 shows a result set 700 for such a table derived from the denormalized table 600 of FIG. 6. In this example, the base table has eleven rows, so it is certain that there will be no more than eleven households. Therefore, each row is matched to a "minimum" household number equal to the row number.

The next step involves creating a table that groups each of the key values in the denormalized lookup table (FIG. 6) to a household number (step 430). This table includes the key codes assigned to each key value to ensure that all entries for a single key value are grouped together. As this table is created, like values within the same key value are eliminated. The result set 800 for one such table is shown in FIG. 8. Because of several like values in the "key_value" column 810, several entries have been eliminated, and thus several household numbers have been removed from the "new_hh_nbr" column 820.

Figure 9:
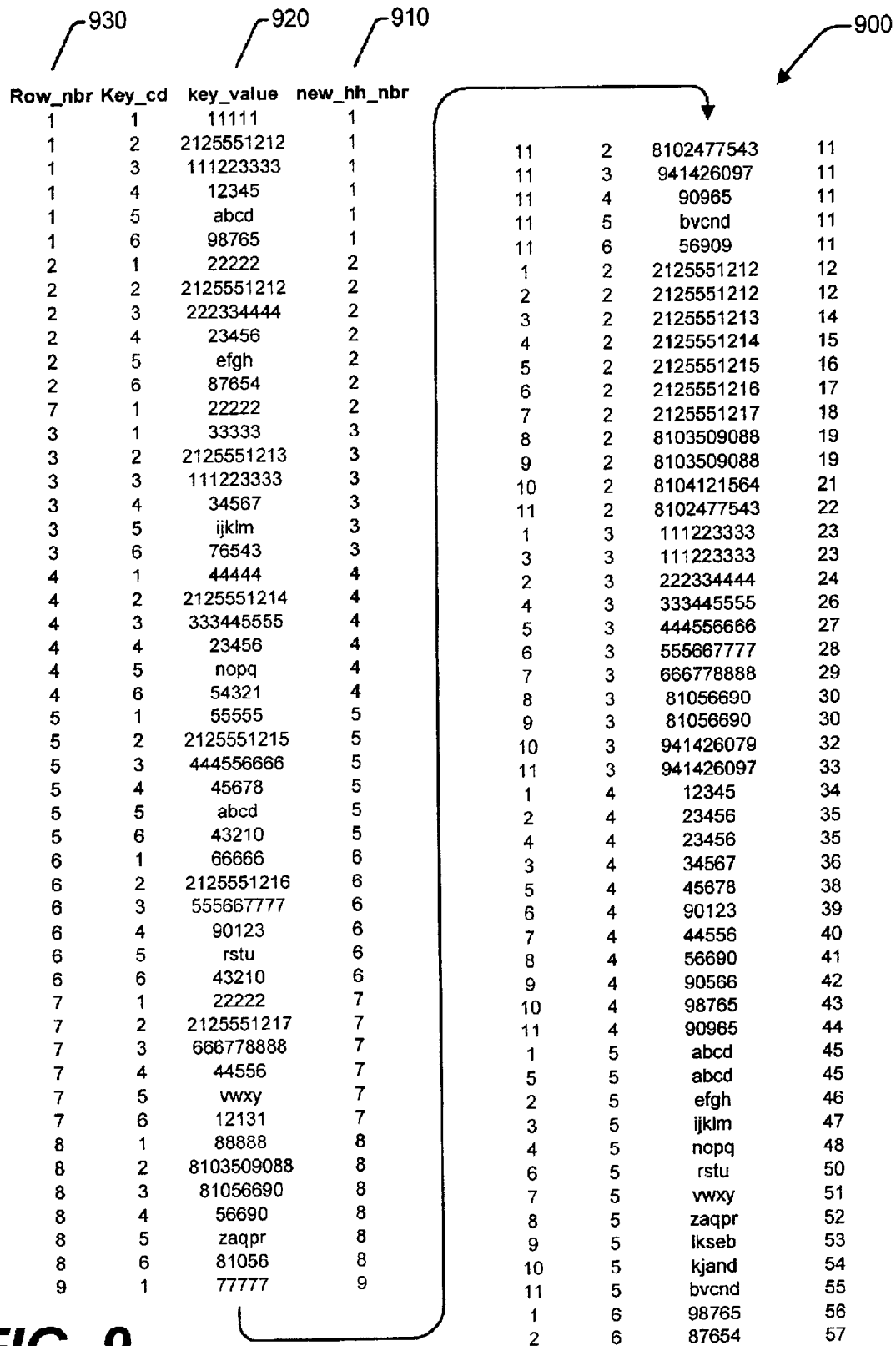

The third step involves "chaining" the data in the tables of FIGS. 7 and 8 with the data in the table of FIG. 6 to form a new table using the new lowest possible household number for the key values in the denormalized table of FIG. 6 (step 440). FIG. 9 shows a result set 900 for one such result. This result set includes a column 910 ("new_hh_nbr") showing the lowest household number for each key-value entry in the "key_value" column 920 (step 440). The entries in this table are grouped by row number, as shown in the "row_nbr" column 930.

The fourth step involves creating a new table that groups the key values, selecting for each key-value group the minimum household number from the result set 900 of FIG. 9 that corresponds to that key-value group (step 450). FIG. 10 shows a result set 1000 for one such table. This table shows eleven total household numbers, listed sequentially from one to eleven.

The fifth step involves comparing all columns from the result set 1000 of the previous iteration to result set 1000 of the current iteration to see if any changes have occurred (step 460). If so, the chaining process is still ongoing, and the five-step process repeats. If not, the chaining process is complete.

Figure 11:
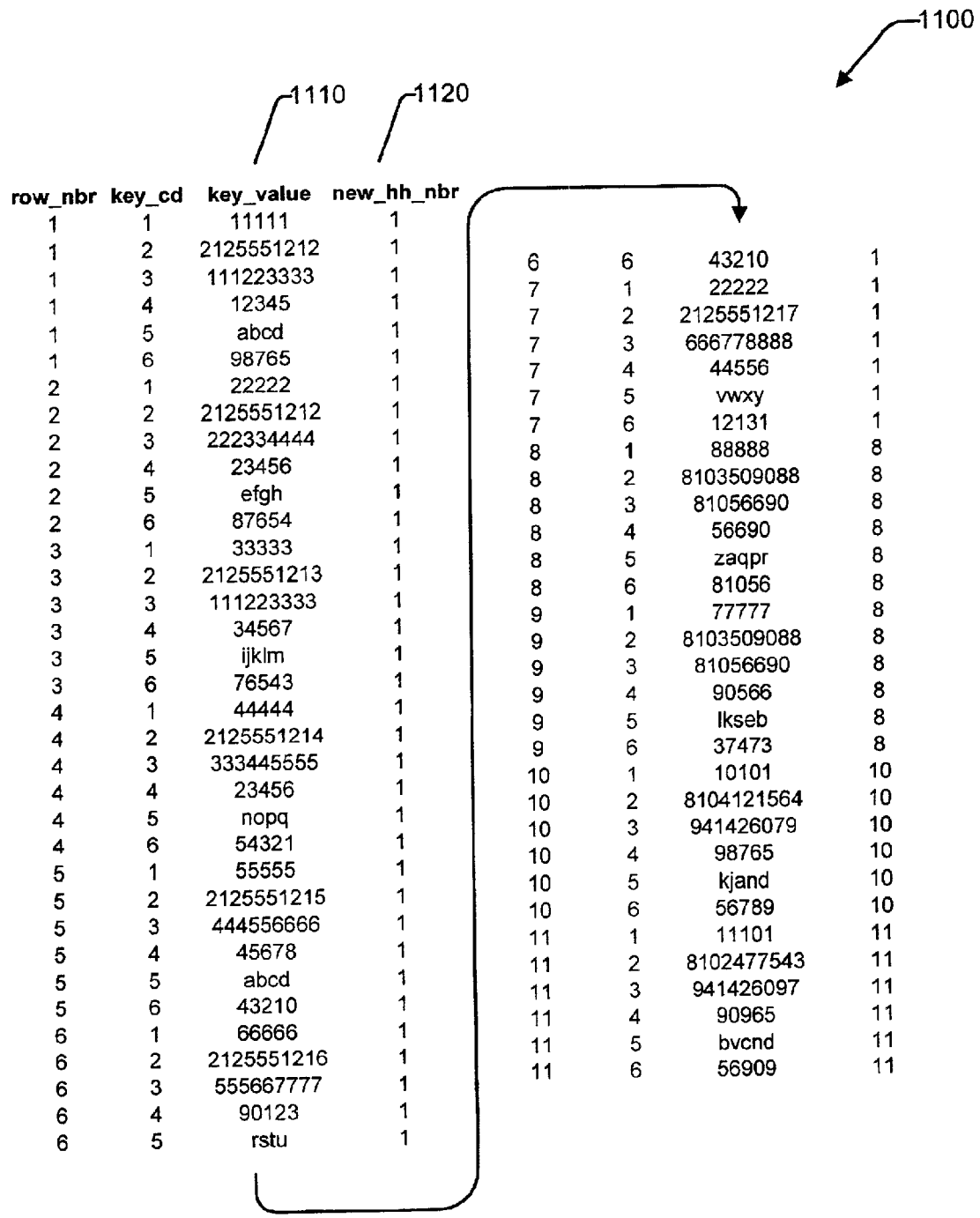
FIG. 11 is a result set derived from a database table generated during a final step of the chaining process.

On each iteration, an increasing number of the key values are grouped into households, and the number of households (i.e., the "maximum household numbers") continually decrease. In the end, the process yields a table that contains data like that shown in the result set 1100 of FIG. 11, where every entry in the "key_value" column 1110 has been chained to one of four households—households one, eight, ten, and eleven—as shown in the "new_hh_nbr" column 1120.

When the final iteration of the five-step process is complete, the household numbers are joined to the base table to produce a table 1200 like that shown in FIG. 12. This table includes the same information as the base table of FIG. 3, plus an additional column 1210 identifying the household to which each data record belongs. In this example, the first seven data records all define a single household (household one); rows eight and nine define a single household (household eight); and the last two rows each define a single household (households ten and eleven). This table becomes the basis of information for use in conducting a much more efficient and productive campaign than those previously possible.

Implementation in a Data-warehousing System

Figure 13:
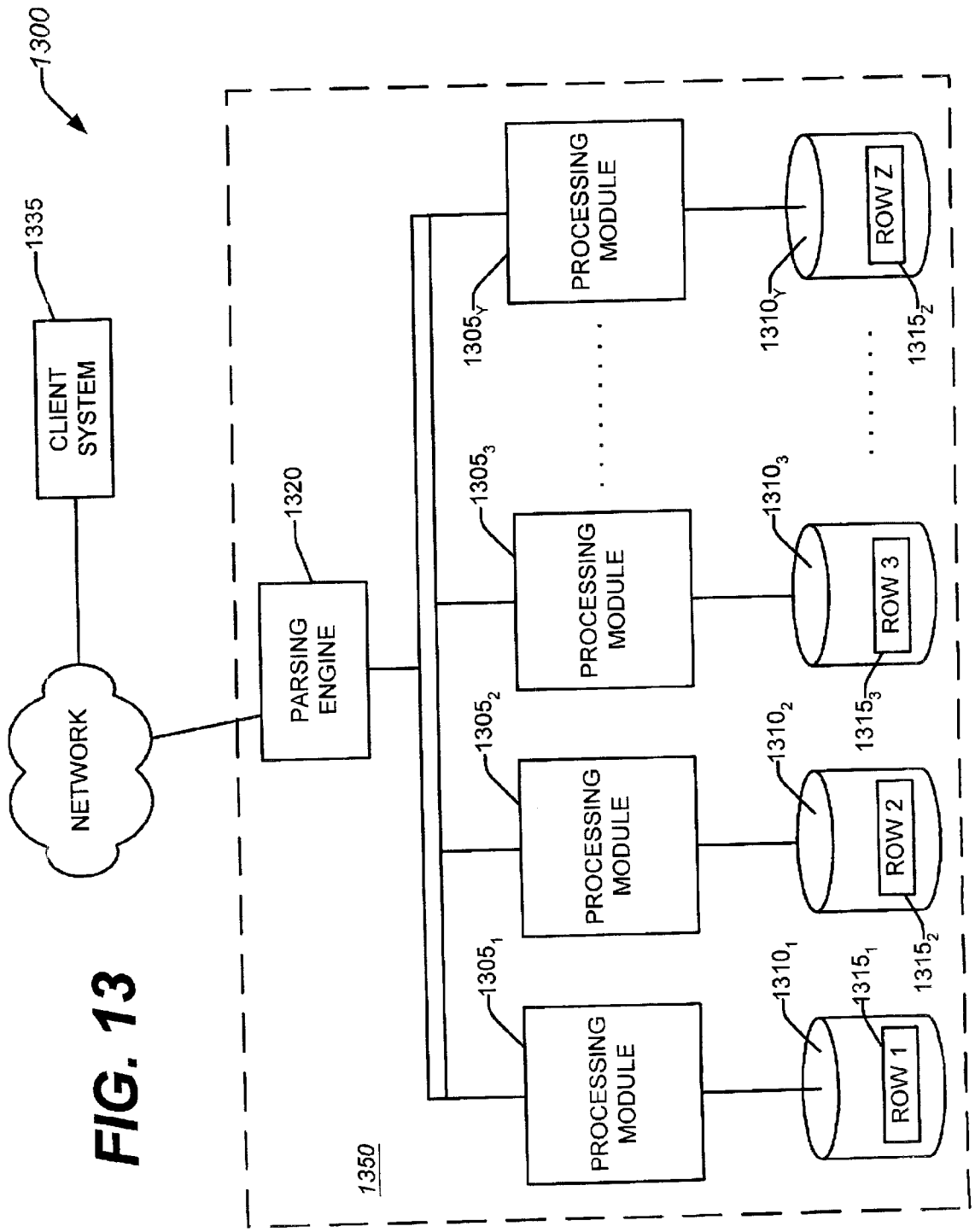
FIG. 13 is a schematic diagram of a data-warehousing system suitable for use in implementing a householding technique.

The techniques described here are particularly useful when implemented in a data-warehousing systems. FIG. 13 shows one such data-warehousing system 1300. This system 1300 includes a relational database management system (RDBMS) built upon a massively parallel processing (MPP) platform.

As shown here, the data warehouse 1300 includes one or more processing modules $1305_{1 \ldots Y}$ that manage the storage and retrieval of data in data-storage facilities $1310_{1 \ldots Y}$. Each of the processing modules $1305_{1 \ldots Y}$ manages a portion of a database that is stored in a corresponding one of the data-storage facilities $1310_{1 \ldots Y}$. Each of the data-storage facilities $1310_{1 \ldots Y}$ includes one or more disk drives.

The system stores business data, such as customer-transaction data, in one or more tables in the data-storage facilities $1310_{1 \ldots Y}$. The rows $1315_{1 \ldots Z}$ of the tables are stored across multiple data-storage facilities $1310_{1 \ldots Y}$ to ensure that the system workload is distributed evenly across the processing modules $1305_{1 \ldots Y}$. A parsing engine 1320 organizes the storage of data and the distribution of table rows $1315_{1 \ldots Z}$ among the processing modules $1305_{1 \ldots Y}$. The parsing engine 1320 also coordinates the retrieval of data from the data-storage facilities $1310_{1 \ldots Y}$ in response to queries received from a user at a mainframe 1330 or a client computer 1335. The data warehouse usually receives queries in a standard format, such as the Structured Query Language (SQL) put forth by the American National Standards Institute (ANSI).

FIG. 14 shows a computer system 1400 suited for use in executing computer programs that embody the techniques described above. In general, the computer 1400 includes one or more processors 1405, one or more temporary data-storage components 1410 (e.g., volatile and nonvolatile memory modules), one or more persistent data-storage components 1415 (e.g., optical and magnetic storage devices, such as hard and floppy disk drives, CD-ROM drives, and magnetic tape drives), one or more input devices 1420 (e.g., mice, keyboards, and touch-screens), and one or more output devices 1430 (e.g., display consoles and printers).

The computer 1400 operates on executable program code 1435 that is usually stored in one of the persistent storage media 1415 and then copied into memory 1410 at run-time. The processor 1405 executes the code by retrieving program instructions from memory in a prescribed order. When executing the program code, the computer receives data from the input and/or storage devices, performs operations on the data, and then delivers the resulting data to the output and/or storage devices.

In some embodiments, the computer is a special-purpose computer that performs only certain, specialized functions. In other embodiments, the computer is a general-purpose computer programmed to perform the functions needed by the company conducting the campaign.

The text above describes one or more specific embodiments of a broader invention. The invention also is carried out in a variety of alternative embodiments and thus is not limited to those described here. For example, while the techniques are described in terms of carrying out a customer-relationship management (CRM) campaign, the techniques are useful in wide variety of business applications, including inventory control and human-resource management. Many other embodiments are also within the scope of the following claims.

We claim:

1. In a database system that stores information about the customers of a business in one or more relational tables, a method for use in linking multiple records that represent a particular customer, the method comprising:

combining data from two or more attribute columns in one or more of the relational tables to form a single column of concatenated data;

identifying two or more records that share a common value in the column of concatenated data, indicating that the records all represent a particular customer;

assigning a unique identification value to the customer; and storing the identification value with each of the identified records.

2. The method of claim 1, where the customer is a group of individuals who all live together in a single household.

3. The method of claim 1, where the customer is a single individual.

4. The method of claim 1, where the concatenated data includes information about both the customer's name and customer's address.

5. A computer program, stored on a tangible storage medium, for use in linking multiple customer records in a database system that stores information about the customers of a business in one or more relational tables, the program comprising executable instructions that cause a computer to:

combine data from two or more attribute columns in one or more of the relational tables to form a single column of concatenated data;

identify two or more records that share a common value in the column of concatenated data, indicating that the records all represent a particular customer;

assign a unique identification value to the customer; and store the identification value with each of the identified records.

6. The program of claim 5, where the customer is a group of individuals who all live together in a single household.

7. The program of claim 5, where the customer is a single individual.

8. The program of claim 5, where there concatenated data includes information about both the customer's name and customer's address.

* * * * *